United States Patent
Seet et al.

(10) Patent No.: US 8,295,363 B2
(45) Date of Patent: Oct. 23, 2012

(54) RESTORING PROGRAM INFORMATION FOR CLIPS OF BROADCAST PROGRAMS SHARED ONLINE

(75) Inventors: Nicholas Seet, La Jolla, CA (US); Adam Cahan, San Francisco, CA (US)

(73) Assignee: Yahoo! Inc., Sunnyvale, CA (US)

(*) Notice: Subject to any disclaimer, the term of this patent is extended or adjusted under 35 U.S.C. 154(b) by 933 days.

(21) Appl. No.: 12/210,639

(22) Filed: Sep. 15, 2008

(65) Prior Publication Data

US 2009/0077049 A1 Mar. 19, 2009

Related U.S. Application Data

(60) Provisional application No. 60/972,637, filed on Sep. 14, 2007.

(51) Int. Cl.
*H04N 7/12* (2006.01)

(52) U.S. Cl. ............... 375/240.26; 707/791; 707/802

(58) Field of Classification Search ........... 375/240.26; 707/791, 802
See application file for complete search history.

(56) References Cited

U.S. PATENT DOCUMENTS

| | | | | |
|---|---|---|---|---|
| 7,174,293 B2 * | 2/2007 | Kenyon et al. | ............... | 704/231 |
| 7,194,752 B1 * | 3/2007 | Kenyon et al. | ............... | 725/22 |
| 7,421,376 B1 * | 9/2008 | Caruso et al. | ............... | 702/190 |
| 7,783,489 B2 * | 8/2010 | Kenyon et al. | ............... | 704/270.1 |
| 7,870,574 B2 * | 1/2011 | Kenyon et al. | ............... | 725/19 |
| 2003/0001887 A1 * | 1/2003 | Smith, IV | ............... | 345/741 |
| 2005/0001903 A1 * | 1/2005 | Endler et al. | ............... | 348/207.1 |
| 2005/0229204 A1 * | 10/2005 | Kalker | ............... | 725/19 |
| 2006/0190776 A1 * | 8/2006 | Oostveen et al. | ............... | 714/700 |
| 2007/0050590 A1 * | 3/2007 | Syed et al. | ............... | 711/170 |
| 2007/0204285 A1 * | 8/2007 | Louw | ............... | 725/14 |
| 2007/0214480 A1 * | 9/2007 | Kamen | ............... | 725/53 |
| 2007/0294544 A1 * | 12/2007 | Ishikawa et al. | ............... | 713/193 |
| 2008/0208849 A1 * | 8/2008 | Conwell | ............... | 707/5 |
| 2008/0209502 A1 | 8/2008 | Seidel | | |

FOREIGN PATENT DOCUMENTS

WO WO 03/098627 11/2003
WO WO 03098627 A2 * 11/2003

OTHER PUBLICATIONS

Espacenet search, Eapacenet Result List, Nov. 2011.*
European Supplemental Search Report (EP 08831109.7) dated Jul. 10, 2012; 7 pages.

* cited by examiner

*Primary Examiner* — Taghi Arani
*Assistant Examiner* — Shan Elahi
(74) *Attorney, Agent, or Firm* — James J. DeCarlo; Greenberg Traurig, LLP

(57) ABSTRACT

To restore context information about a clip that was sampled from a broadcast program, the clip is identified by matching a digital fingerprint of the clip against a database of known digital fingerprints taken from broadcast programs. If the clip can be identified, it is then associated with information about the matching broadcast program. The loss of context data about the clip obtained from a broadcast program is thus remedied, enabling media content available online to be more useable for a variety of purposes, such as media searching, automatic broadcast attribution, and targeting advertisements.

18 Claims, 5 Drawing Sheets

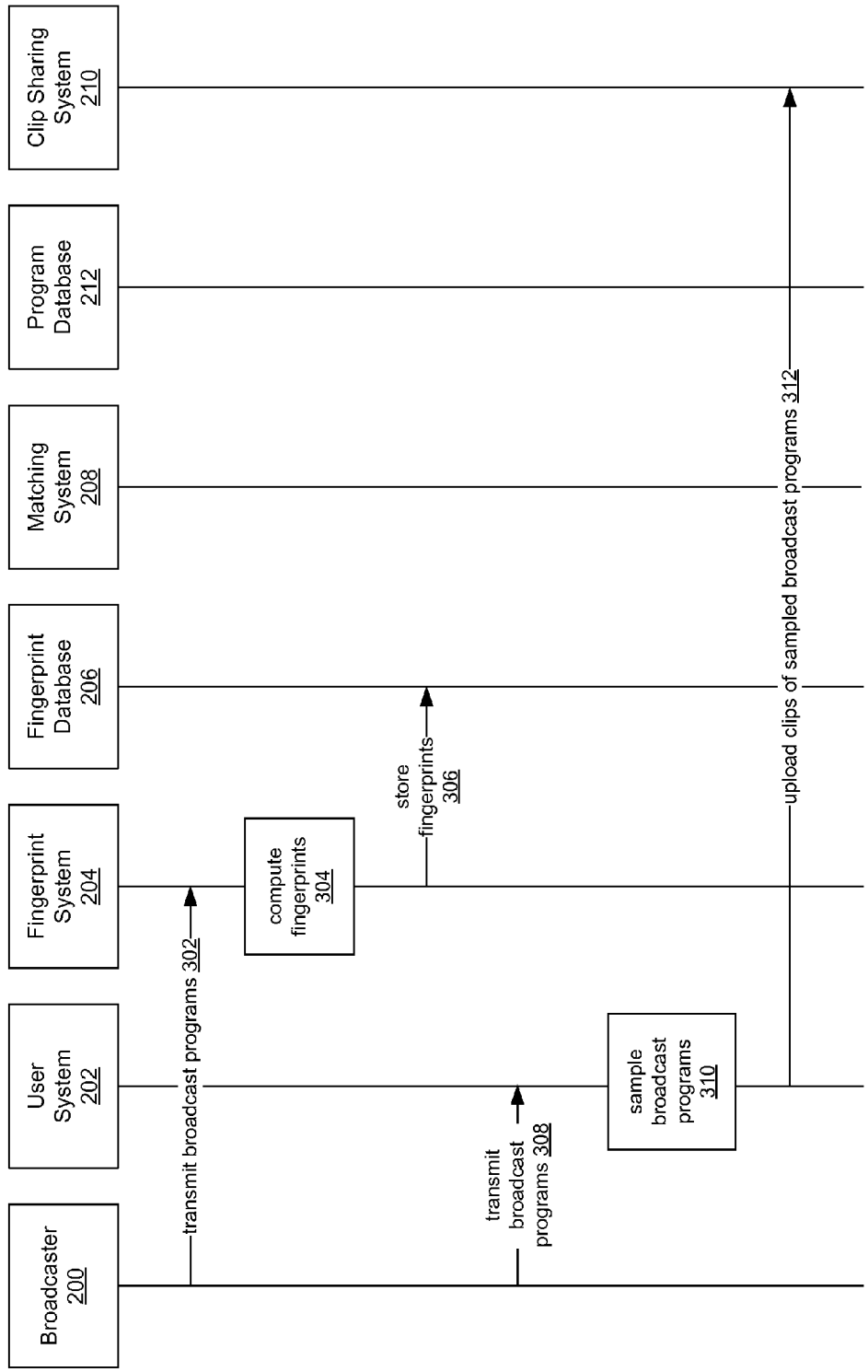

RESTORING PROGRAM INFORMATION FOR CLIPS OF BROADCAST PROGRAMS SHARED ONLINE

CROSS REFERENCE TO RELATED APPLICATIONS

This application claims the benefit of U.S. Provisional Application No. 60/972,637, filed Sep. 14, 2007, which is incorporated by reference in its entirety.

BACKGROUND

This invention relates generally to online sharing of media content, and in particular to restoring the program information that is typically lost when users sample clips from broadcast programs and then share those clips online. The invention is also related to various uses of the restored program information, such as media searching, automatic broadcast attribution, and targeting advertisements.

The Internet has seen an explosive growth of user-generated content (UGC), which is now available online from a vast number of community sharing websites and other online sharing systems. Many websites cater exclusively or almost exclusively to receiving UGC from users and then offering that content to other users. While some of this UGC is created by the users who upload the content, a significant, if not a majority, of the content is obtained from users who have sampled (or "clipped") the content from a broadcast program and then uploaded the clip. This leads to a number of problems that are inherent in the distribution of clips that have been obtained from broadcast programs.

One issue is that the content of broadcast programs is largely protected by intellectual property rights, such as copyrights. The copying and redistribution of this protected content requires the permission of the rights holders, who are generally not amenable to the unrestricted sharing by others of the protected content, via UGC sharing websites or any other online means. Accordingly, it is difficult to enable online sharing of clips obtained from broadcast programs without running afoul of the intellectual property laws.

Another problem that arises with clips obtained from broadcast programs results from the process by which the clips are obtained and then shared. When a broadcast program is initially broadcast to subscribers, the program is broadcast in its intended context. This context may include a particular time when the program is broadcast and a particular channel in which the program is broadcast. The context of a broadcast program may be maintained as program information that is stored separately in a program guide, such as an electronic program guide (EPG). A problem occurs when a user samples or digitizes a broadcast program, since the context information about the program is typically lost. This is because the subsequent sharing of the program is disassociated from the broadcast program's original context, for example, because it is no longer played in the original broadcast context. In particular, the content is no longer played at the time in which the program was scheduled to be played, in the channel or frequency on which it was originally contained, and possibly without other identifying context information associated with the original broadcast signal.

Moreover, broadcast programs often include embedded data to identify the program and/or other information about the program. In the case of a television program, for example, this data may be embedded in the VBI in the signal. The digitization or sampling process in which a user obtains a video clip from the original television broadcast typically strips this embedded data. The media content of the resulting clip is therefore no longer paired with the information about the broadcast program from which the video clip was obtained. When uploaded to a UGC website or other sharing system, the clip would thus lack identifying information about the broadcast program from which the clip was obtained.

The loss of program information for clips obtained from broadcast programs is unfortunate, since that information could be helpful in a variety of applications, including searching for the content on a UGC website by potential viewers and/or owners of the content, as well as pairing advertisements and other information about the content by an operator of the website or other source of the content. Users sometimes provide this information manually, but this is inherently unreliable and incomplete. What are needed, therefore, are methods and techniques for addressing the deficiencies that may arise when clips obtained from broadcast programs are shared online.

SUMMARY

Embodiments of the invention restore the program information that may be lost when an item of media content, or clip, has been sampled from a broadcast program and then shared online. To restore the program information for a clip being shared on an online sharing system, the clip may first be identified. This identification may be performed, for example, by matching a digital fingerprint of the clip against a database of known digital fingerprints taken from a plurality of broadcast programs. If the clip's fingerprint matches a known fingerprint, the broadcast program from which the clip was sampled has been determined. The program information for the broadcast program that matched the clip may then be obtained from a database of program information, such as an electronic program guide. Once the program information for the matching broadcast program is obtained, the information is then associated with the clip to restore what had been lost when the clip was obtained from the original broadcast program. In particular, the loss of context about a clip obtained from a broadcast program can be remedied, thereby making the clips available on online sharing system more useable for a variety of purposes. The restored program information may be used to improve, for example searching for content, automatic broadcast attribution, and targeting advertisements.

BRIEF DESCRIPTION OF THE DRAWINGS

FIGS. 3A and 3B are interaction diagrams of a process for restoring program information for a sampled clip, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
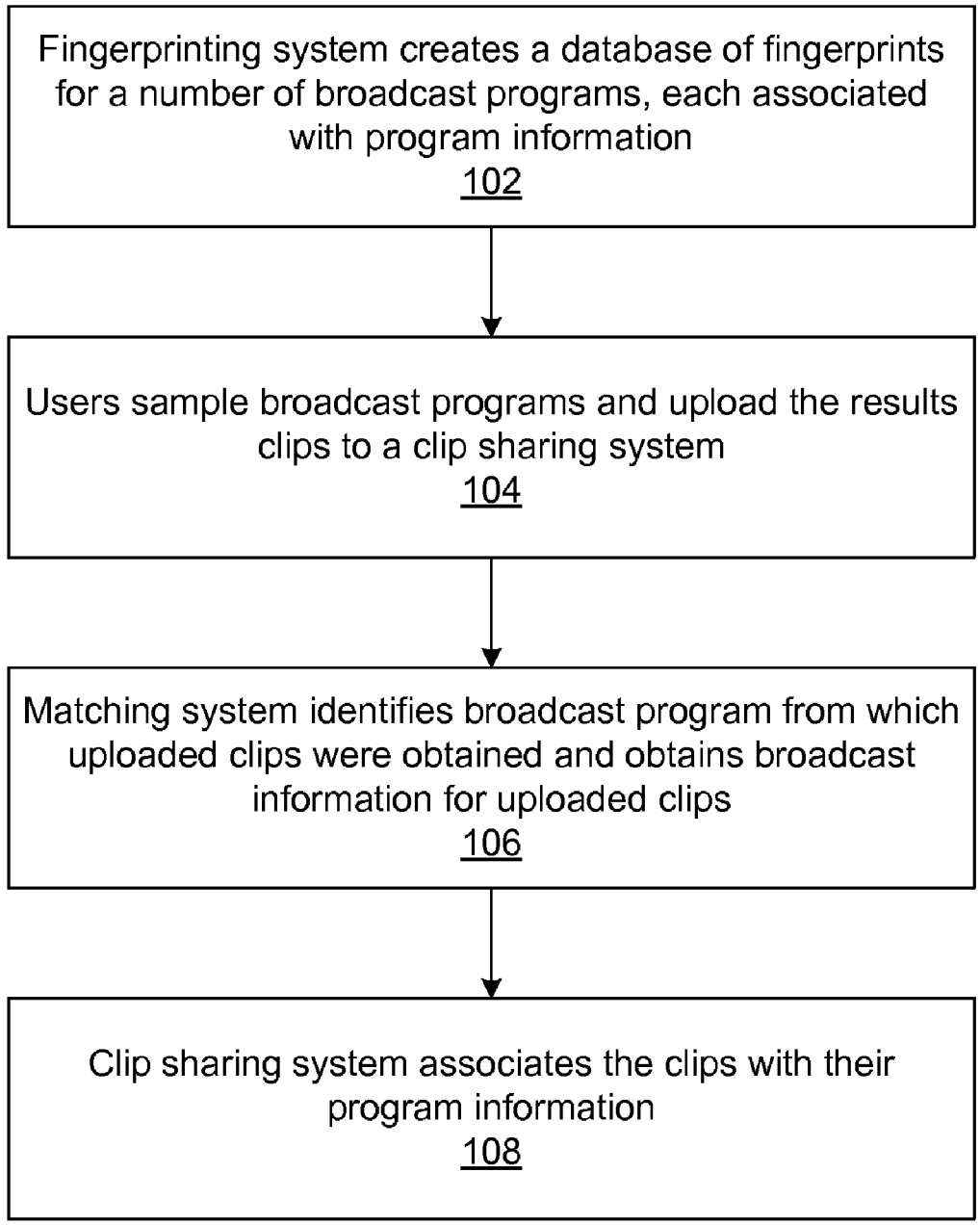
FIG. 1 is a diagram of a methodology for restoring program information for a sampled clip, in accordance with an embodiment of the invention.

FIG. 1 illustrates an overview of a general methodology for restoring program information lost when a clip is sampled from a broadcast program and then uploaded for online sharing. In one stage of the methodology, a fingerprinting system creates 102 a database of digital fingerprints for a number of different broadcast programs. The resulting fingerprint database provides a set of reference fingerprints that can be used to identify an unknown clip that may be contained in one of the broadcast programs. In another stage, which may occur before, after, or in parallel with the fingerprinting discussed above, users may individually sample 104 clips or other content from one or more of the broadcast programs. The users may then upload the sampled clips to one or more other clip sharing systems, such as a user-generated content (UGC) sharing website. In so doing, the users have distributed content from a broadcast program outside of the original broadcast context of the program.

For a number of reasons, it may be desirable to restore for a clip the program information that was lost when the clip was uploaded to the sharing system. To achieve this, a matching system uses the database of reference fingerprints to identify 106 the broadcast program from which an uploaded clip was obtained, and the corresponding program information for the program is then obtained. With the program information matched to clip, the clip sharing system may then associate 108 this program information with the clip. In this way, the clip sampled from an original broadcast program and shared online can retain its program information, even outside the context of the original broadcast.

Figure 2:
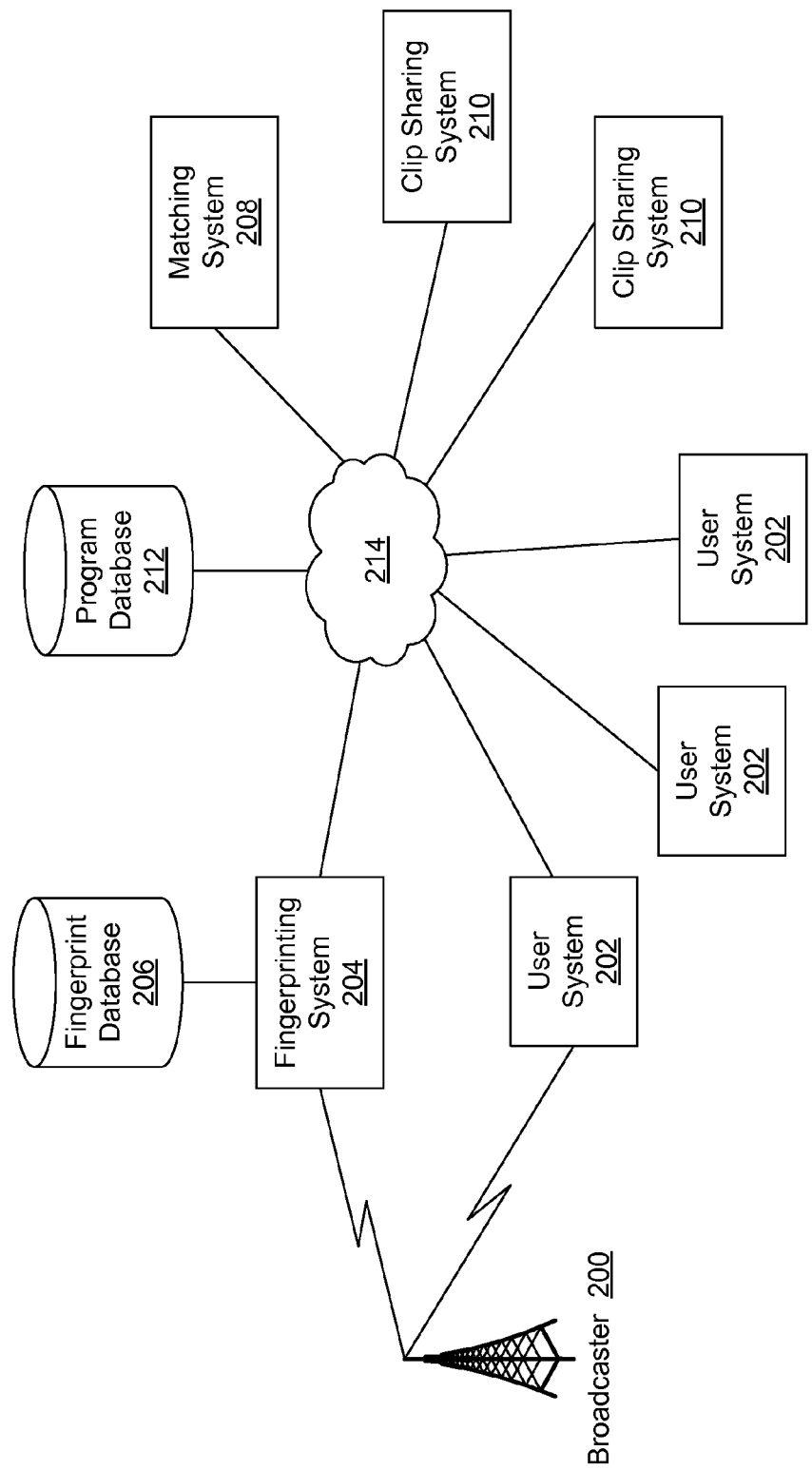
FIG. 2 is a network diagram of a system for restoring program information for a sampled clip, in accordance with an embodiment of the invention.

Embodiments of the methodology illustrated in FIG. 1 may be performed by the system shown in FIG. 2, although many variants of this system are possible in other embodiments. Any of the elements illustrated in FIG. 2 may be implemented in a single combined system, or by any number of distributed systems working to perform the functionalities described herein.

As shown in FIG. 2, a broadcaster 200 sends a transmission signal that comprises a series of broadcast programs. Although only a single broadcaster 200 is shown in this figure, in a practical embodiment a plurality of broadcasters 200 would simultaneously transmit broadcast programs, each of which could be tuned to by a suitable receiver for the broadcast medium. The broadcaster 200 may transmit any kind of media content, such as a television program, a radio program, a streaming Internet program, or any other item of media content that can be delivered to one or more other users. As used herein, a broadcast program may refer to an entire broadcast program or any portion of a broadcast program, including any advertisements that may be contained therein. The broadcast program may comprise audio and/or video content, for example a television program, a radio program, or a streaming media broadcast, without limitation. Alternatively, the broadcast program may originate from any other source capable of outputting media content to a number of destinations, and it is not limited to content that is delivered by any traditional delivery mechanism. For example, a television broadcast need not be delivered by radio frequency, cable, satellite, or any other particular means.

One or more user systems 202 include a receiver for receiving a broadcast signal from the broadcaster 200 and, if necessary, demodulating and/or decoding the signal to obtain the broadcast program contained therein. The user systems 202 also include hardware and/or software for sampling the broadcast program to obtain a clip of all or part of a particular program. To allow communication over a computer network 214, such as the Internet, the user systems 202 further include a network interface. In this way, a user system 202 may obtain a broadcast program, generate a clip from the broadcast program, and then upload the clip via the network 214 to a remote location.

It can be appreciated that a user system 202 may comprise any number of systems and devices, and combinations thereof, to perform these functionalities. For example, a user system 202 may comprise a cable set top box that decodes a cable signal to provide a video signal to a personal computer, which contains software for extracting a digital video clip from the video signal. That personal computer can then be used to log into the Internet and upload the video clip to a UGC sharing website. In another example, a user system 202 may comprise a single device, such as a cell phone, that has a radio receiver for receiving a radio broadcast, software for saving a digitized portion (or clip) of the radio broadcast, and software for uploading the radio clip to a user's online blog. Many other examples are possible within the scope of embodiments of the invention.

The system further includes one or more clip sharing systems 210 which are configured to communicate with one or more user systems 202 to receive the clips therefrom. The clip sharing systems 210 may comprise any system that allows at least one user to upload a clip and then allows other users to download the uploaded clips. In one embodiment, a clip sharing system is a UGC sharing website. Examples of UGC websites include websites that allow user to share their video clips with others by uploading the clips, where other users can search for and download or view the clips from that website. In another embodiment, the clip sharing system 210 comprises a file sharing system, such as a file server that allows users to upload and download clips, or a peer-to-peer network that allows sharing of files among a plurality of users (e.g., where the clip sharing system 210 is implemented at least in part on the user systems 202 themselves). In yet another embodiment, the clip sharing system 210 may comprise a particular user's own personal website, a blog, or a personalized page in a social network, or a collection thereof for each of a number of users. In this example, a single user may upload clips, and a plurality of others with access to the content may view or download the clips. In the overall system, one or more clip sharing systems 210 may exist, and they be of the same or of different types.

Like the user systems 202, a fingerprinting system also includes a receiver for receiving a broadcast signal from the broadcaster 200 and, if necessary, demodulating and/or decoding the signal to obtain the broadcast program contained therein. The fingerprint system 204 further includes hardware and/or software for generating a digital fingerprint that is characteristic of a portion of a broadcast program. The fingerprint system 204 may use any suitable fingerprinting technique. Suitable techniques for generating a digital fingerprint that is characteristic of an item of media content include, without limitation, those disclosed in U.S. Pat. No. 7,421, 376, issued Sep. 2, 2008, and in U.S. patent application Ser. No. 11/219,385, filed Sep. 1, 2005, each of which is incorporated by reference herein.

The digital fingerprints generated by the fingerprint system 204 are stored in a fingerprint database 206. The resulting fingerprint database 206 provides a reference set of digital fingerprints for a set of broadcast programs, which may then be used to identify unknown media content. Accordingly, the more broadcast programs that are represented by fingerprints stored in the fingerprint database 206, the more broadcast programs that can be matched using the fingerprint database 206. In a practical embodiment, a plurality of fingerprinting systems 204 may exist, for example, to handle multiple parallel broadcasts and/or broadcasts that are only available in different physical locations (as in the case of radio). Likewise, the fingerprint database 206 may comprise a single database or multiple databases, and may be local to the fingerprint system 204 or remote from it.

Because the fingerprint system 204 creates the fingerprints from the broadcast program in its original context, the fingerprint system 204 may know the identity of the broadcast program from which each fingerprint has been generated (or, at least, sufficient information to determine the identity of the broadcast program, such as the channel and time of the broadcast). The fingerprints may be associated with the program information for a particular broadcast program by storing the program information with each fingerprint in the fingerprint database 206. However, this approach may be less efficient where there are multiple fingerprints for each broadcast program and the program information takes up more memory than a simple identifier. Alternatively, the fingerprints can be associated with the broadcast program itself, for example, using an index value that references the broadcast program. This allows the program information associated with a fingerprint to be determined at a later time by querying the program database 212 for the program information for the broadcast program associated with the fingerprint.

The program database 212 stores program information for each of a plurality of broadcast programs. For any particular broadcast program, the program information includes information about the broadcast program, which typically depends on the type of broadcast. For a television or radio broadcast, for example, the program information may include one or more: a program title, a channel on which the program was broadcast, a broadcast start and/or stop time, information about the content of the program (e.g., genre, plot, actors, etc.), and any other information about the broadcast program that may be relevant. In one embodiment, the program database 212 comprises an electronic program guide (EPG). The program database 212 may be remote and accessible via the network 214, possibly operated by another entity, or it may be stored locally by the fingerprint system 204 or in another system that may desire access to the database 212.

A matching system 208 is coupled to the network 214 for communicating with the systems described above. As described in more detail below, the matching system 208 includes hardware and/or software for identifying a clip on a clip sharing system 210 by comparing a fingerprint for the clip with the reference fingerprints in the fingerprint database 206, obtaining the corresponding program information for the identified clip, and providing the program information to the clip sharing system 210 so that the lost program information may be restored and used in connection with the clip.

Figure 3B:
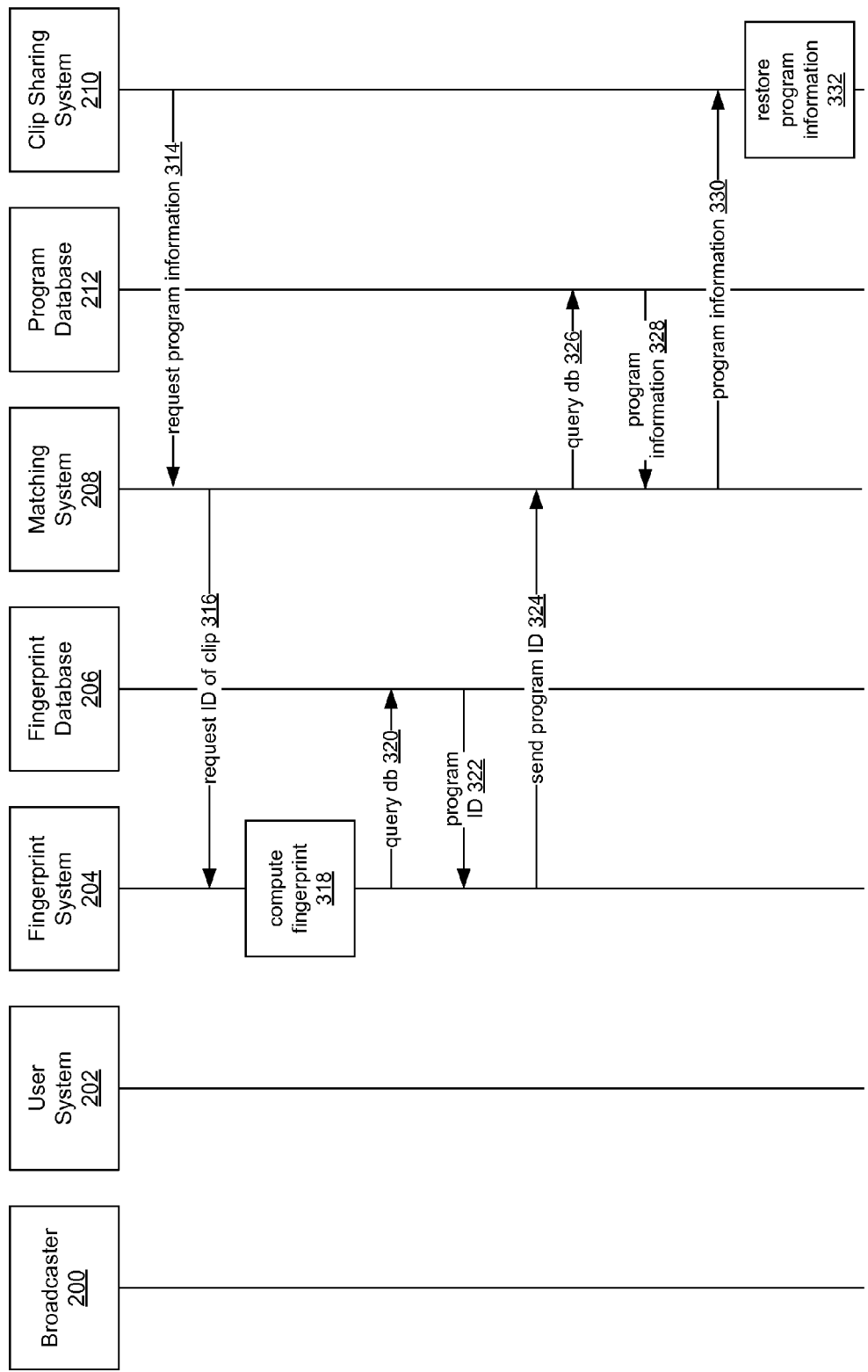

FIGS. 3A and 3B illustrate a process for using the system of FIG. 2 to restore the program information associated with a clip, in accordance with one embodiment of the invention. In a first series of steps, which may correspond to stage 102 of FIG. 1, this process builds a database 206 of reference fingerprints that can be used later for identification of an unknown clip. In this process, a broadcaster 200 transmits 302 a broadcast program, which is tuned to and received the fingerprint system 204. The fingerprint system 204 then computers 304 one or more digital fingerprints for the broadcast program, or a portion thereof, using any of a variety of known techniques. The fingerprint system 204 stores the fingerprints in the fingerprint database 206. As described above, this process repeats over time for a plurality of broadcast programs, and possible from a plurality of broadcasters 200 and/or using a plurality of fingerprint systems 204.

In another series of steps, which may correspond to stage 104 of FIG. 1, the process involves the clipping and sharing of media content by a number of users. The broadcaster 200 transmits 308 broadcast programs that can be received by one or more user systems 202 as well as by the fingerprint system 204. This transmission may be the same broadcast as that received by the fingerprint system 204, or it may be a different one and through different broadcast channels. A particular user may use the user system to sample 310 one or more of the broadcast programs to created one or more clips that contain all or a portion of the programs. This may be done by sampling, recording, digitizing, or any other mechanism by which a user can obtain a digital version of any portion of a broadcast. Optionally, the user system 202 may be used to edit the clips. A user may make clips for their own purposes, or the user may upload 312 the clips to a clip sharing system 210 using the user system 202. The uploading 312 may comprise logging into a content sharing website or other file sharing system and transmitting the clip, or, in the case of a peer-to-peer network, simply making the clip available for downloading by other user systems 202.

Once clips have been uploaded to a clip sharing system 210, other users systems may be used to search for the uploaded clips and view and/or download them. But, as explained above, these uploaded clips will typically lack some or all of the useful context about the broadcast program from which the clips were obtained. Accordingly, various embodiments of the invention will attempt to restore the lost program information for the clips. The series of steps that perform this function, illustrated largely in FIG. 3B, may be triggered on any of a variety of events as desired to achieve particular design objectives for the system. For example, the restoration process may be performed when any new clip that is uploaded to the clip sharing system, when any clip is requested for viewing or download by a user system 202, or periodically (e.g., nightly or other low-peak time period) for any clips whose program information has not yet been restored.

To restore the lost program information for a clip, the clip sharing system 210 sends a request 314 to the matching system 208 for the program information associated with the clip. This request may include a copy of the clip itself, or it may simply include a reference or other identifier for the clip. In the case of a UGC sharing website, for example, the system 210 may pass a URL for viewing the clip to the matching system 208. In one embodiment, the matching system 208 is implemented within the clip sharing system 210, in which case the matching system 208 may already have access to the clips. Accordingly, the matching system 208 may be operated by the same entity and in conjunction with the clip sharing system 210, or it may be operated by a third party and remote from the clip sharing system 210.

To determine the program information to be associated with a particular clip, the matching system 208 determines the identity of the clip. To do this, the matching system 208 sends a request 316 to the fingerprint system 204 for the identity of the broadcast program that contains the clip. This request may include a copy of the clip itself, or it may simply include a reference or other identifier for the clip. The fingerprint system 204 computes 318 a fingerprint for the clip using any suitable fingerprinting algorithm, such as those described above, but generally the same algorithm should be used for the clip as was used to generate the fingerprints in the fingerprint database 206. The matching system 208 then queries 320 the fingerprint database 206 using the fingerprint for the clip to find a match between the clip and a broadcast program represented in the database 206. Alternatively, the matching system 208 generates the fingerprint for the clip and/or queries the fingerprint database 206 to determine the identity of the clip. Any of a variety of matching techniques may be used, as appropriate, such as those described in U.S. patent application Ser. No. 10/132,091, filed Apr. 24, 2002, or U.S. patent application Ser. No. 10/830,962, filed Apr. 22, 2004, each of which is incorporated by reference herein. The query returns 322 in the identity of the program being determined, which the fingerprint system 204 sends 324 to the matching system 208.

If a match is found between the fingerprint for the clip and a fingerprint in the fingerprint database 206, the clip is then identified as being obtained from the broadcast program from which the matching fingerprint in the fingerprint database 206 was associated. Once the identity of the source broadcast program is known for a particular clip, the clip can be associated with the program information that is known for the broadcast program, thereby giving a richer set of information about the clip. In one embodiment, the matching system 208 queries 326 the program database 212 with an identifier for the broadcast program, and the program database 212 returns 328 the program information for that program. The matching system then forwards 330 the program information to the clip sharing system 210, which restores 332 the program information with the clip. Alternatively, the matching system 208 may just send the identity of the broadcast program that contains the clip, and the clip sharing system 210 then obtains the corresponding program information, for example, from the program database 206. The clip sharing system 210 may associate the program information with the clip by storing the program information or a reference thereto on a storage medium in a memory record that is associated with the clip.

In this way, the clip is reconnected the context data about the clip that was lost when the clip was sampled and uploaded by a user or otherwise shared online. This matching and reconnecting may be performed for many or all of the clips available through the clip sharing system 210, and the process may be performed for several different clip sharing systems 210. With the additional program information providing useful context about the clips known, a number of applications for using the clips are enabled.

Figure 4:
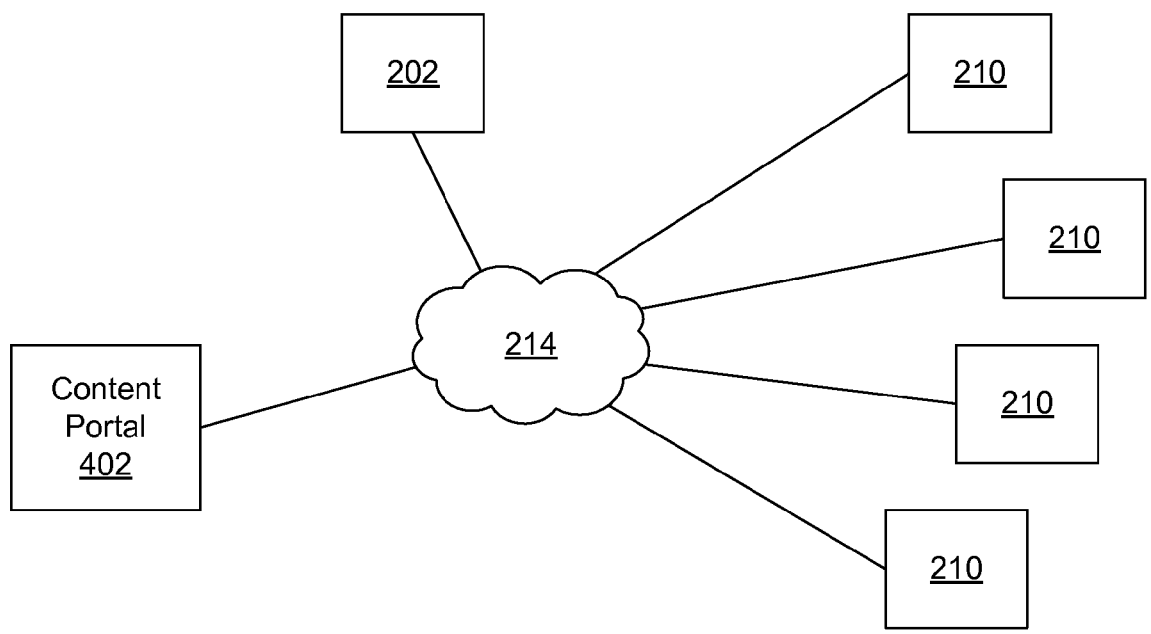
FIG. 4 is a system diagram of a centralized content portal allowing a search for clipped content across a plurality of sharing systems, in accordance with an embodiment of the invention.

FIG. 4 illustrates a system configured to apply embodiments of the process described above to enable centralized searching of multiple clip sharing systems 210. In this embodiment, a content portal 402 enables a user system 202 to search across a number of online sharing systems 210 to locate clips available on any of these sharing systems 210. The content portal 402 searches the clip sharing systems 210 for a plurality of clips available thereon. The content portal 402 may store a reference to the clip (e.g., the URL at which it can be accessed) and the clips sharing system 210 that is offering the clip. Once clips on the various sharing systems 210 are located, the content portal 402 performs, by itself or in concert with other systems, embodiments of the process described above to identify the clips and then obtain program information for them. The content portal 402 then stores the program information in association with the clips. Once the content portal 402 has accumulated information for multiple clips on the clip sharing systems 210 and program information associated with those clips, a user system 202 can search this information on the content portal 402. In particular, a user system 202 may search the content portal 402 using search criteria based on the program information (e.g., to return a list of all known clips having a search term in the title of the broadcast program, or all known clips from a particular channel).

In one embodiment, the content portal 402 comprises a website that references clips across multiple UGC sites. The content portal 402 performs the matching and association of the program information with various clips available on other UGC websites, as described above. The content portal 402 further includes a search interface that searches across and redirects users to the clips located at any of the multiple UGC websites. The search experience is improved by the use of the restored program information and by enabling search and retrieval across multiple UGC websites.

This kind of central website may also facilitate content owners in locating their content available on the Internet, which may allow for easier policing of violations of their intellectual property rights. The program information that is associated with these clips, in various embodiments of the invention, helps the content owners locate their content that is available for public download from the one or more websites. An ISP may also use an embodiment of the invention proactively to locate protected content so that it can be filtered before it is allowed to be shared, thus enabling the ISP to comply with applicable digital rights laws.

In another application, the program information that has been associated back with the clips can be used for improved searching of content on a particular online clip sharing system 210, such as a UGC sharing website. For example, if a user is searching the UGC website for a particular show, the user can enter the title of the show to obtain a more reliable listing of the available clips on the website. Without the program information attached to the clips, the resulting search may easily be incomplete, as the uploading users might have had to manually enter the show information. In such a process, the uploading user may choose not to add the show title information or may do so incorrectly. Embodiments of the invention thus enable more reliable and efficient searching of a UGC website.

In one embodiment, a clip on a clip sharing system 210 may include meta data about the clip (such as keywords or specific fields of data) provided manually, for example, by the user who uploaded the clip and/or by other users who have reviewed it. This meta data may be considered untrusted because it may be incomplete, inaccurate, or both. Once the program information has been obtained for the clip, in accordance with embodiments of the invention described herein, this untrusted meta data may be verified. In particular, if a portion of the meta data matches the program information, the other portions of it may be considered more trustworthy. Conversely, if none of the meta data matches the program information, it may be considered untrustworthy. The measure of trustworthiness may be presented to a user and/or used by the system 210, for example, in a search algorithm (e.g., to give the less trustworthy terms less importance in the results of a search).

In another application, the program information associated with a particular clip may be used for better targeting of advertisements and/or pairing of other information to be presented to a user who is downloading or viewing a clip from the clip sharing system 210. The improved targeting may results from the fact that the sharing system 210 has a greatly enhanced set of information about at least some of the clips available from the sharing system 210. In particular, this enhanced set of information may describe the original broadcast program, which is the type of information that advertisers often use to target their advertisements. With previous sharing systems, such as video sharing websites, advertisers may have been reluctant to spend advertising revenue because the meta data associated with the uploaded clips may be unreliable and susceptible to manipulation. With embodiments of the invention, however, the information known about the clips is reliable, making it more likely that an advertiser will spend money in such a forum.

Moreover, these advertisements can be presented in exchange for the copyright holder's permission to share the content in the clips. Since better targeted advertisements is enabled, the advertising is more valuable and the copyright holders are thus more likely to permit sharing of at least some of the content. In situations where the rights holder does not wish to share the content, or wished to apply certain limits to the sharing, the enhanced information about the broadcasts from which the clips were obtained allows the rights holder to police the content on one or more clip sharing systems 210 more easily and more accurately.

In another application, an attribution message may be automatically generated and presented along with a clip from the clip sharing system 210. As used herein, an attribution message is any informational message that communication all or a portion of the program information associated with a clip. The attribution message may comprise a textual and/or graphical content presented next to or overlaid over the clip being provided. Alternatively, the attribution message may comprise and audio or video stream that is also presented with the clip to communicate program information about it to a user.

In one example, where the clip is from a television broadcast, the broadcast information may include data obtained from an EPG. The video clip may then be displayed with an overlay graphic that contains the attribution message, comprising the restored program information from the EPG. This enables the audience of the clip to benefit from information about when the program typically airs and/or on which broadcaster or broadcast channel provides the full broadcast program. The content owner benefits from this attribution and promotion of the broadcast program from which the clip was taken, and the content owner may even allow the clip sharing system 210 to share a protected clip because of this benefit.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

identifying, by a computer, a clip available on an online clip sharing system, the clip containing at least a portion of a broadcast program;

obtaining, by the computer, a digital fingerprint for the clip;

matching, by the computer, the digital fingerprint of the clip against a plurality of reference fingerprints to identify the broadcast program in the clip, the reference fingerprints corresponding to a plurality of known broadcast programs;

obtaining, by the computer, program information associated with the identified broadcast program based at least in part on the matching of the digital fingerprint of the clip against the plurality of reference fingerprints;

associating, by the computer, the program information with the clip;

storing, by the computer, the program information in association with the clip in a computer-readable storage medium;

receiving, by the computer, a request for the clip from a user system;

receiving, by the computer, targeting criteria for each of a set of advertisements;

selecting, by the computer, an advertisement for the requested clip by applying the targeting criteria for a plurality of the advertisements to the program information associated with the clip;

generating, by the computer, an attribution message for the requested clip, the attribution message comprising at least a portion of the program information about the clip; and communicating, by the computer, the clip with the attribution message and the selected advertisement to the user system.

2. The method of claim 1, wherein the clip comprises a video clip.

3. The method of claim 1, wherein the broadcast program is a television broadcast.

4. The method of claim 1, wherein the clip sharing system is a user-generated content sharing website.

5. The method of claim 1, wherein the clip sharing system comprises a peer-to-peer file sharing network.

6. The method of claim 1, wherein the program information comprises at least one item of information selected from a group consisting of: a title of the broadcast program; a start time for the broadcast program; an end time for the broadcast program; and a channel on which broadcast program was broadcast.

7. The method of claim 1, further comprising: receiving a search query for a clip, the search query specifying a search term for a field of program information; obtaining a list of clips associated with program information matching the search query; and presenting the list of matching clips.

8. A non-transitory computer readable storage medium for restoring program information for a clip sampled from a broadcast program and shared online, the non-transitory computer readable storage medium comprising computer program code for execution by a processor, the computer program code comprising instructions for:
identifying a clip available on an online clip sharing system, the clip containing at least a portion of a broadcast program;
obtaining a digital fingerprint for the clip;
matching the digital fingerprint of the clip against a plurality of reference fingerprints to identify the broadcast program in the clip, the reference fingerprints corresponding to a plurality of known broadcast programs;
obtaining program information associated with the identified broadcast program based at least in part on the matching of the digital fingerprint of the clip against the plurality of reference fingerprints;
associating the program information with the clip;
storing the program information in association with the clip in a computer-readable storage medium;
receiving a request for the clip from a user system;
receiving targeting criteria for each of a set of advertisements;
selecting an advertisement for the requested clip by applying the targeting criteria for a plurality of the advertisements to the program information associated with the clip;
generating an attribution message for the requested clip, the attribution message comprising at least a portion of the program information about the clip; and
communicating the clip with the attribution message and the selected advertisement to the user system.

9. The non-transitory computer readable storage medium of claim 8, wherein the clip comprises a video clip.

10. The non-transitory computer readable storage medium of claim 8, wherein the broadcast program is a television broadcast.

11. The non-transitory computer readable storage medium of claim 8, wherein the clip sharing system is a user-generated content sharing website.

12. The non-transitory computer readable storage medium of claim 8, wherein the clip sharing system comprises a peer-to-peer file sharing network.

13. The non-transitory computer readable storage medium of claim 8, wherein the program information comprises at least one item of information selected from a group consisting of: a title of the broadcast program; a start time for the broadcast program; an end time for the broadcast program; and a channel on which broadcast program was broadcast.

14. The non-transitory computer readable storage medium of claim 8, further comprising computer program code for:
receiving a search query for a clip, the search query specifying a search term for a field of program information;
obtaining a list of clips associated with program information matching the search query; and
presenting the list of matching clips.

15. A system comprising:
a fingerprint database containing a plurality of reference fingerprints, the reference fingerprints corresponding to a plurality of known broadcast programs;
a fingerprinting system configured to receive one or more broadcast signals containing a plurality of broadcast programs, to obtain one or more fingerprints of the broadcast programs, and to store the fingerprints in the fingerprint database;
a program database containing program information for a plurality of broadcast programs;
a matching system configured to identify a clip available on an online clip sharing system and identify a broadcast program in the clip by matching a fingerprint of the clip with a reference fingerprint in the fingerprint database, the matching system further configured to obtain program information associated with the identified broadcast program based at least in part on the matching of the fingerprint of the clip with the reference fingerprint and associate the program information with the clip
a system configured to:
receive a request for the clip from a user system;
receive targeting criteria for each of a set of advertisements;
select an advertisement for the requested clip by applying the targeting criteria for a plurality of the advertisements to the program information associated with the clip;
generate an attribution message for the requested clip, the attribution message comprising at least a portion of the program information about the clip; and
communicate the clip with the attribution message and the selected advertisement to the user system.

16. A method comprising:
searching, by a computer, a plurality of clip sharing websites to locate a plurality of clips thereon;
identifying, by the computer, at least a portion of the clips by matching the clips against a reference database;
obtaining, by the computer, broadcast data for the identified clips;
receiving, by the computer, a search query specifying at least an item of program information for the identified clips;
providing, by the computer, a list of clips associated with program information that satisfies the search query, the list of clips obtained based at least in part on the matching of the clips against the reference database;
receiving, by the computer, a request for a clip from a user system;
receiving, by the computer, targeting criteria for each of a set of advertisements;
selecting, by the computer, an advertisement for the requested clip by applying the targeting criteria for a plurality of the advertisements to program information associated with the clip;

generating, by the computer, an attribution message for the requested clip, the attribution message comprising at least a portion of the program information about the clip; and communicating, by the computer, the clip with the attribution message and the selected advertisement to the user system.

17. The method of claim 16, wherein the clips comprise video clips.

18. The method of claim 16, wherein the program information for each clip comprises at least one item of information selected from a group consisting of:
- a title of the broadcast program;
- a start time for the broadcast program;
- an end time for the broadcast program; and
- a channel on which broadcast program was broadcast.

* * * * *